(No Model.)
E. MILLER.
LAMP HANGER.
No. 395,845.  Patented Jan. 8, 1889.
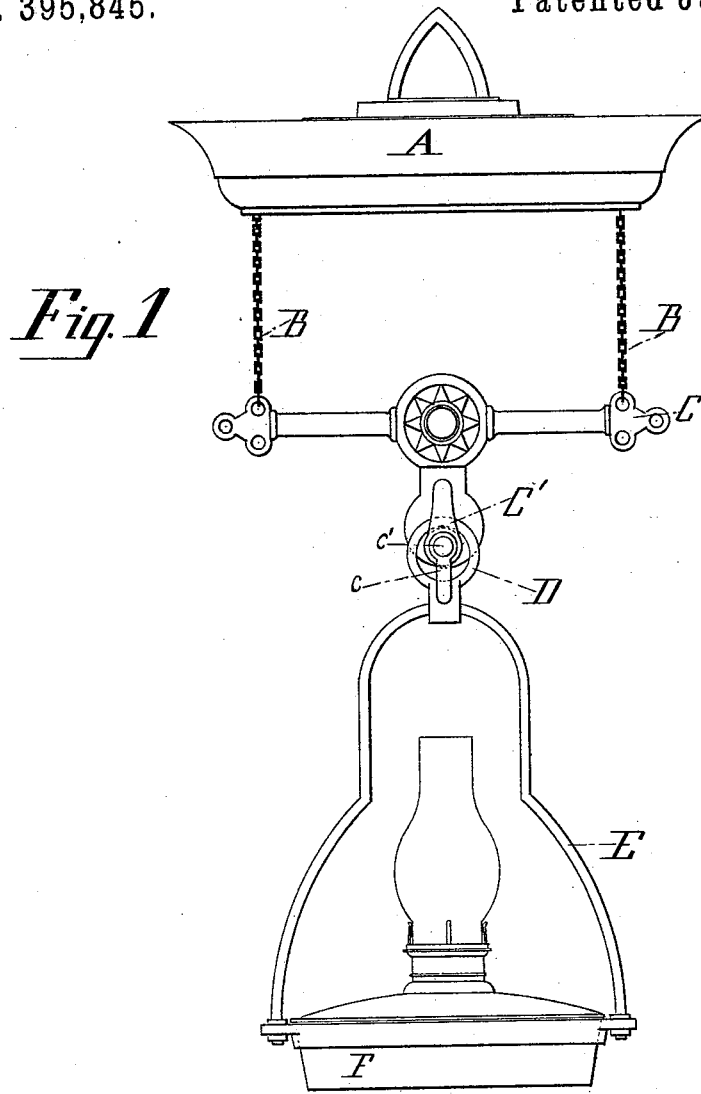
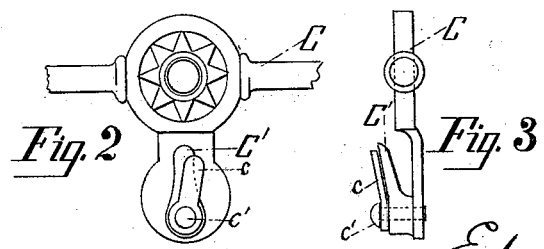
Witnesses.
E. B. Hawley.
I. B. Miller.
Edward Miller
INVENTOR
per Geo. L. Cooper Atty.

UNITED STATES PATENT OFFICE.

EDWARD MILLER, OF MERIDEN, CONNECTICUT, ASSIGNOR TO EDWARD MILLER & COMPANY, OF SAME PLACE.

LAMP-HANGER.

SPECIFICATION forming part of Letters Patent No. 395,845, dated January 8, 1889.

Application filed June 29, 1888. Serial No. 278,523. (No model.)

*To all whom it may concern:*

Be it known that I, EDWARD MILLER, of the city of Meriden, county of New Haven, and State of Connecticut, have invented a new and useful Improvement in Lamp-Hangers, of which the following is a specification.

My invention relates to that class of lamp-hangers in which a lamp-supporting frame or "harp" is detachably connected with chains wound upon a spring-drum or attached to a counterpoising-weight, so that the lamp may be vertically adjusted.

In the accompanying drawings, Figure 1 represents in perspective a lamp-fixture embodying my invention; Fig. 2, a detail of my device, also in perspective; Fig. 3, a vertical section of the portion shown in Fig. 2, taken through the line $x\ x$.

Similar letters refer to like parts in the several views.

A designates a canopy containing a spring-inclosing drum on which are wound the chains B B; C, a cross-bar connecting the free ends of the chains B B; C′, a hook on the cross-bar C; c, a button pivotally attached to the hook C by means of the rivet or screw $c'$; D, a loop on the lamp-supporting frame or harp E; F, a lamp supported in the harp E.

The form of device embodying my invention, as here illustrated, is constructed and operated as follows: The canopy A is provided with a loop adapted to engage with a ceiling-hook. It contains a spring-drum, on which are wound the chains B B, the free ends of which below the canopy are connected by the cross-bar C. On the cross-bar C is the hook C′, adapted to engage with a loop, D, on the harp E, which supports the lamp F. On the hook C′ is a button, c, pivotally attached at one end by a screw or rivet, $c'$. When it is desired to hang the loop D on the hook C′, the free end of the button c is turned upward, as shown in Figs. 2 and 3. When the loop D is engaged with the hook C′, the free end of the button is turned downward to the position shown in Fig. 1, thereby preventing the accidental disengagement of the loop D from the hook C′. The button c may be so loosely held by the pivot $c'$ as to fall into the position shown in Fig. 1 by its own weight, or it may be made tight enough to require to be turned down by the hand of the operator.

It is understood that the lamp F and harp E are intended to be vertically adjustable in a manner common to what are known to the trade as "spring-extension fixtures"—*i. e.*, the weight of the lamp and the adjustable part of the fixture is balanced against the force of a coiled spring, so that a slight effort on the part of the operator suffices to raise or lower the lamp. As the weight of the lamp is a constantly-varying factor, it has been found necessary to interpose a brake or stop to check or prevent the rotation of the drum and the consequent winding up of the chains thereon. Owing to this brake or stop, it has frequently happened in fixtures of this class that the operator, desirous of raising the lamp, has lifted the loop of the harp from the hook at the free ends of the chains, thereby permitting them to be wound up with great force, sometimes to the serious injury of the fixture—as by breaking the spring or the like. To obviate this difficulty is the object of my present invention. It will be seen that with the button c in the position shown in Fig. 1 the loop D cannot be disengaged from the hook C′. At the same time the advantage of the pivotal connection of the hook C′ and the loop D is preserved, so that the lamp will not be tilted out of a horizontal plane by the uneven winding of the chains B B, as would be the case if this connection were rigid. Again, the harp E may readily be detached at any time from the hook C′ and hung upon a stationary hook or otherwise, as desired.

I have shown a canopy containing a spring-drum on which are wound two chains; but I do not desire to be understood as limiting myself to any particular form of means for vertical adjustment of the lamp and harp, nor to any particular number of chains, cords, or bands or other flexible supports.

What I claim as my invention, and desire to secure by Letters Patent of the United States, is as follows:

In a hanger for lamps and other articles, the combination of a hook adapted to engage with and support a loop or ring, and a button pivotally attached at one end to the lower end of said hook and adapted to be turned upward in a line with said hook, so as to permit the engagement of said loop or ring and to be afterward turned downward to prevent the disengagement of said loop or ring, substantially as described.

EDWARD MILLER.

Witnesses:
GEO. L. COOPER,
E. B. HAWLEY.